Feb. 3, 1970     M. W. FITZMAURICE ET AL     3,493,294
RETRODIRECTIVE MODULATOR

Filed Aug. 7, 1967

INVENTORS.
PETER O. MINOTT
MICHAEL W. FITZMAURICE

BY

ATTORNEYS ed States Patent Office 3,493,294
Patented Feb. 3, 1970

3,493,294
RETRODIRECTIVE MODULATOR
Michael W. Fitzmaurice, East Riverdale, and Peter O. Minott, Greenbelt, Md., assignors to the United States of America as represented by the Administrator of the National Aeronautics and Space Administration
Filed Aug. 7, 1967, Ser. No. 658,955
Int. Cl. G02f 1/34
U.S. Cl. 350—285            8 Claims

ABSTRACT OF THE DISCLOSURE

An optical modulator and retrodirector comprises a primary, concave spherical mirror and a secondary, convex spherical mirror located approximately at the focal point of the primary mirror. The secondary mirror is moved about the focal point in response to a modulating signal source. Correction of spherical aberration is attained by the inclusion of a spherical correcting lens, concentric with and having the same radius of curvature as the secondary mirror, and with an aspherical correcting lens. The radius of the primary mirror is different from that of the secondary mirror, but all of the spherical elements named have a common center of curvature.

---

The invention described herein was made by employees of the United States Government and may be manufactured and used by or for the Government for governmental purposes without the payment or any royalties thereon or therefor.

The present invention relates generally to optical modulators and more particularly to an optical modulator and retrodirector employing a primary reflector and a secondary focus spoiling reflector driven in response to a modulating signal source.

With the advent of lasers, the feasibility of communication between a plurality of widely separated points by modulating a coherent optical carrier is being seriously considered. The space program is one of the most important fields in which optical communication via lasers is likely to be utilized, e.g., communicating between the earth and an artificial satellite thereof and/or vice versa.

One of the techniques previously employed to a great extent for modulating optical energy relies upon an electro-optical effect of crystals on the polarization of a light beam. Generally, electro-optical systems employ a light source in proximity to a polarizing crystal to effect selective and variable attenuation of energy from the source. For space applications, therefore, a coherent source must be carried in a satellite transmitting information to the earth via an optical carrier. In transmitting information from a satellite to the earth, however, the power and space requirements of a coherent optical source are generally exceeded by the constraints inherent in the satellite structure. Hence, it is frequently impractical to employ an electro-optical modulator on presently available earth satellites, particularly those satellites employed solely for communication purposes.

To avoid the problems inherent with maintaining a coherent source on an artificial earth satellite, it has been previously proposed to utilize the satellite as an optical modulator utilizing retrodirective principles. In a satellite communication system employing a retrodirective modulator on the satellite, a coherent beam of light is transmitted from the earth to the modulator. The modulator intercepts a portion of the beam and redirects it back to the original source, or some other point, after amplitude modulation in response to a modulating information signal source. By positioning the retrodirective modulator on an artificial earth satellite, and the coherent source on the earth, the problems of power and space attendant with maintaining a coherent source on the satellite are obviously obviated.

Seemingly, one of the most obvious manners for modulating and retrodirecting optical energy is to employ a polarization changing, crystal optical modulator and mirror at the situs of the modulation source. A problem exists, however, with regard to this type of electro-optical modulator for space applications, since a satellite is usually free to move relative to a ground based source of optical energy. In particular, crystal type electro-optical modulators have a finite geometric axis for optical ray traces. The existence of a geometrical axis for optical ray traces prevents an electro-optical modulator from having a relatively large field of view, greater than 20° of arc, because collimated light must be fed into the system along the axis. To fulfill the requirement that optical energy reaching the satellite be confined to an arc within ±10° of the modulator geometric axis, relatively complex, heavy and space-consuming gyros must be employed for satellite position stabilization.

To avoid the problems attendant with mounting an electro-optical modulator on a space craft as a retrodirector, a system that is non-axial for geometrical optical ray traces has been developed by Peter O. Minott and is embodied in U.S. application Ser. No. 591,007, filed Oct. 31, 1966, and has a common assignee with the present invention. In the previously developed system, an interferometer is located, effectively, in the focal plane of an optical reflecting system. One of the interferometer elements is translated relative to the other in response to excitation of a piezoelectric crystal responsive to a modulation source.

The previously developed interferometer system, however, has at least two inherent disadvantages, relating to fabrication and variations in spacing between the interferometer surfaces as a function of temperature and time. In an interferometer system, the spacing between the two interference elements must be maintained to tolerances of at least one-eighth of a wave length of the optical energy to prevent the derivation of erroneous information. Regarding fabrication, it is quite difficult to assemble two concentric interferometer surfaces separated on the order of approximately 500 angstroms. Spacing between the interferometer elements is dependent to a large extent on temperature because the crystal attached to one of the interferometer elements has a different temperature coefficient of expansion from the interferometer elements. In addition, the thermal expansion characteristics of the two interferometer elements cannot be matched exactly. Spacing between the two interferometer elements is a function of time because the dimensions of the crystal modulating the relative positions of interferometer elements relative to each other is variable due to aging. The combination of these disadvantages appears to make an optical retrodirective modulator utilizing interferometer techniques a formidable engineering task, at best.

According to the present invention, the problems of the prior art crystal, polarization changing electro-optical and interferometer retrodirector modulation techniques are avoided by utilizing a retrodirective modulator employing focus spoiling techniques. In particular, a spherical primary mirror intercepts unmodulated energy from a source and directs it to a secondary, spherical mirror located approximately at the focal point of the primary mirror. The position of the secondary mirror is translated relative to the focal point in response to movement of a piezoelectric crystal that is driven by a modulating signal source, whereby the power per unit area of energy reflected from the primary mirror varies with the modulating source. The precise positional relationships necessary for an interferometer retrodirective system are not present in a focus spoiling system because the spacing between the primary and secondary mirrors of the focus spoiling system may be varied by as much as one wavelength without materially adversely affecting modulation. In other words, the positional sensitivity of the focus spoiling system is approximately an order of magnitude less than the interferometer system. In consequence, the focus spoiling system is considerably less difficult to fabricate and assemble than the interferometer system and the effects of temperature and crystal aging are considerably reduced.

It is, accordingly, an object of the present invention to provide a new and improved retrodirective modulator for optical energy.

Another object of the present invention is to provide an optical, retrodirective modulator employing focus spoiling techniques.

A further object of the present invention is to provide a new and improved retrodirective optical modulator wherein the tolerance of the modulating element position is on the order of a wavelength, rather than a fraction of a wavelength.

An additional object of the present invention is to provide a new and improved retroactive optical modulator that is relatively facile in manufacture and fabrication and wherein positional changes due to temperature and time do not have a particularly adverse effect on the modulator performance.

Still another object of the present invention is to provide a new and improved retrodirective optical modulator wherein a modulating element is driven by a piezoelectric crystal and problems attendant with crystal aging are minimized.

A further object of the invention is to provide a new and improved retrodirective optical modulator that does not require position stabilization relative to an optical source of energy to be modulated.

The above and still further objects, features and advantages of the present invention will become apparent upon consideration of the following detailed description of one specific embodiment thereof, especially when taken in conjunction with the accompanying drawings, wherein.

Figure 1:
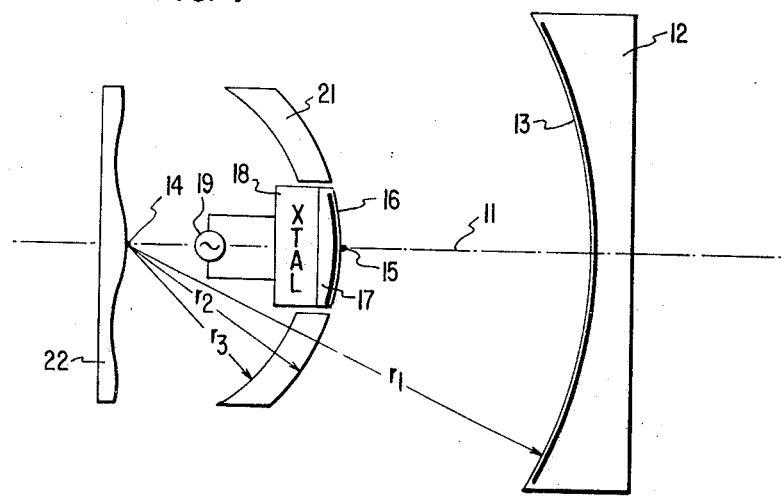
FIGURE 1 is a side sectional, schematic view of the optical system of the present invention.

Reference is now made to the retrodirective modulator of FIGURE 1, a cross-sectional view taken through the center of the optical system of the present invention. All of the elements illustrated on FIGURE 1 are figures of revolution taken about longitudinal geometrical axis 11 of the optical system.

The optical system comprises a primary mirror 12 having a concave, spherical reflecting surface 13, having a radius $r_1$ from its center of curvature 14. Positioned to be responsive to light reflected from mirror 12 and approximately at focal point 15 of reflecting surface 13, is convex, spherical reflecting surface 16 of secondary mirror 17. Mirror 17 is fixedly secured to one surface of piezoelectric crystal disk 18, responsive to a source 19 of audio modulation. Reflecting surface 16 of mirror 17 has the same center of curvature 14 as reflecting surface 13, but has a considerably smaller radius than reflecting surface 13, as indicated by the radial line $r_2$.

To correct for spherical aberrations introduced into light reflected from mirrors 12 and 17, spherical correcting lens 21, having an annular cross-section, is positioned to be concentric with secondary mirror 17. Correcting lens 21 has the same radius and center of curvature as surface 16 of mirror 17 closest to mirror 13, but has a smaller radius of curvature on the surface located remotely from mirror 13, as indicated by the radius $r_3$. The center of curvature, however, for the surface of lens 21 remote from mirror 13 is coincident with the center of curvature of reflecting surfaces 13 and 16, namely at point 14. Correcting lens 21 removes approximately 99% of the spherical aberration introduced in the reflected light beams from surfaces 13 and 16; the remaining 1% of the spherical aberration is corrected by aspherical lens 22.

Aspherical correcting lens 22 has a planar surface remotely located from the remainder of the optical retrodirective modulator of the present invention and an undulating surface facing the remainder of the system. The center of the undulating surface is coincident with the center of curvature 14 of the spherical reflectors 13, 16 and the two surfaces of lens 21. The curvature of aspherical correcting lens 22 is greatly exaggerated in FIGURE 1; in actuality the corrector is a very weak lens with slopes approximately one-fourteenth the value of a Schmidt system of equal aperture.

Because spherical reflecting surfaces 13 and 16 have coincident centers of curvature, the optical system disclosed is considered as being non-axial for geometrical ray traces. Thereby, optical energy impinging on the system from any ray angle in the field of view of mirror surface 13 can be theoretically handled. In other words, the optical system compriing reflectors 13 and 16 functions in a manner similar to a well-known corner cube and energy is invariably reflected back to its point of origin. Because spherical mirrors, however, inherently possess aberration, correcting lenses 21 and 22 are provided to enable the system to respond equally to radiation impinging on the system from any angle relative to axis 11. By including lenses 21 and 22, the effects of spherical aberration are virtually eliminated and the system can be considered as truly non-axial for geometrical, optical ray traces. Because the system is non-axial, but has a center of curvature at point 14, ray energy entering the system aperture through lens 22 at any angle is invariably reflected back to the point of origin and there is no need for stabilizing the position of the retrodirective modulator of the present invention.

Figure 2:
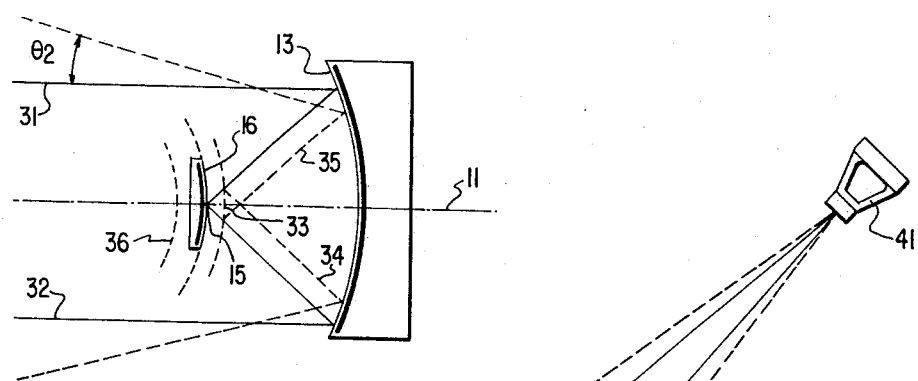
FIGURE 2 is a diagram graphically illustrating the manner in which modulation is achieved by controlling beam divergence according to the present invention.

Reference is now made to FIGURE 2 of the drawings to provide a graphic illustration for indicating the manner in which the present invention functions as an optical retrodirective modulator. In FIGURE 2, it is initially assumed that the center of secondary reflecting surface 16 is located exactly at focal point 15 of primary reflecting surface 13. Under such circumstances, substantially all of the energy entering the system through lens 21 is reflected from surface 13 to a point on mirror 16, except for the energy intercepted by disk 18 and the back of mirror 17. For example, the energy in a light beam indicated by ray traces 31 and 32, parallel to axis 11, is reflected from surface 13 to focal point 15. Since substantially all of the energy in the light beam impinges on the single point 15, at the focal point of reflecting surface 13, the optical energy reflected from surface 16 is directed back to mirror 13 to form a light beam coincident, exactly, with the beam originally directed to the primary mirror. Thereby, the light beam reflected from mirror 16 when it is at focal point 15 occupies a minimum area at a point lying along axis 11 and removed from surface 13. A detector, located along axis 11 at the predetermined point, having an area less than the space occupied by the return beam therefore derives a predetermined, maximum output in response to reflecting surface 16 being located at focal point 15.

If it is assumed that reflecting surface 16 is driven by piezoelectric crystal 18 along axis 11 to a line 33 between reflecting surface 13 and focal point 15, the retrodirected light beam derived from rays 31 and 32 is divergent. This conclusion follows by considering that light beams 31 and 32 intercept reflecting surface 16 at a point removed from the system longitudinal axis when the reflecting surface is translated to line 33. Light rays 31 and 32 are reflected from surface 16 as light beams 34 and 35, respectively, which are in turn reflected from primary reflecting surface 13 along lines oblique to longitudinal axis 11 and differ therefrom by the angle $\theta/2$. Thereby, energy in the beam defined by rays 31 and 32 is retrodirected at a finite divergence angle away from axis 11 and occupies a greater area than the energy retrodirected from the system when mirror 16 lies on focal point 15. Therefore, the amount of energy in a unit area at a point along axis 11 removed from surface 13 is less when mirror surface 16 lies along line 33 than when the mirror is positioned at focal point 15 and the detector previously mentioned generates a smaller output signal. In a similar manner, translation of reflecting surface 16 along the longitudinal axis 11 of the optical system to line 36, on the far side of focal point 15 from reflecting surface 13, causes the beam defined by rays 31 and 32 to be diverged when reflected back to a detector.

Figure 3:
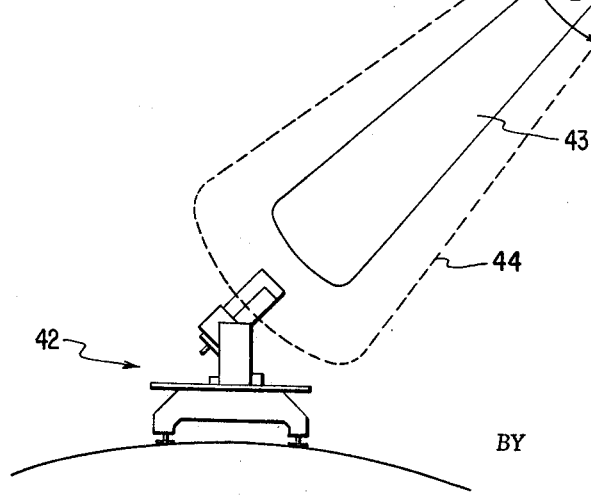
FIGURE 3 is an illustration of one manner in which the present invention may be utilized.

Reference is now made to FIGURE 3 of the drawings wherein one use of the present invention is illustrated. In the system of FIGURE 3, the retrodirective modulator of FIGURE 1 is mounted on board space craft 41. The space craft includes environmental detectors of a well-known device for deriving signals that function as modulation source 19 for driving piezoelectric crystal disk 18. The retrodirective modulator system included within satellite 41 is responsive to unmodulated light originating from laser transceiver 42, located at a ground position. The retrodirective modulator system responds to the coherent, unmodulated light from transceiver 42 and diverges the light in accordance with the signal energy applied to crystal 19, which in turn controls the position of mirror 16 along axis 11. The retrodirector contained on satellite 41 directs the optical energy back to transceiver 42, where it is detected and utilized for deriving information indicative of the parameter controlling the position of reflecting surface 16.

Assuming that reflecting surface 16 lies in the plane of focal point 15 of primary reflecting surface 13, the retrodirected light beam has a relatively small divergence at time $t_1$, as indicated by beam 43, having a divergence angle of $\theta_1$. At some other time $(t+\delta t)$ during the drive cycle of the source controlling the position of reflecting surface 16, e.g., when surface 16 is coincident with line 33, the retrodirected optical energy has a greater divergence, as indicated by beam 44, having a divergence of $\theta_2$. Beams 43 and 44 both have an area considerably in excess of the detection surface area of transceiver 42, whereby the detector in the transceiver intercepts only a portion of the energy reflected from the retrodirector in satellite 41. At time $t_1$, the energy in the retrodirected beam intercepted by the detector of transceiver 42 is greater than the amount of energy at time $t_1+\delta t$ because the beam has a greater area at the latter time than the former and the same total energy.

Thereby, amplitude modulation of the coherent carrier originally emitted by transceiver 42 is achieved by the optical retrodirective modulator included in space craft 41, without the space craft having any of the requirements of power and space attendant with a coherent source contained therein. Another advantage of the present system is that energy from transceiver 42 is invariably reflected back to the transceiver site by the optical system contained on space craft 41, regardless of the space craft azimuthal position because the optical system is non-axial for geometrical, optical ray traces, but has a single point of curvature 14 for both of the mirrors therein. A further feature of the system of FIGURE 3 is that the transmitter and receiver are both located on earth, and are accessible for monitoring and repairing functions. It is also noted that only one tracking mount, which inherently must have highly accurate and stabilized positional specifications, is required since both the optical transmitter and receiver are at the same situs.

A further feature of the system indicated by FIGURE 3 is that maximum energy density of the retrodirected beam is derived to enhance signal-to-noise ratio at transceiver 42. The energy density is maximized since the retrodirected beam is collimated to the diffraction limit by the optical system included in space craft 41.

While we have described and illustrated one specific embodiment of our invention, it will be clear that variations of the details of construction which are specifically illustrated and described may be made without departing from the true spirit and scope of the invention.

We claim:

1. A modulator retrodirector for optical energy comprising a primary reflecting mirror means for said energy, said primary reflecting means having a focus point, a secondary reflecting means for said energy located approximately at the focus point of said primary reflecting means, said primary and secondary reflecting means being positioned so that optical energy impinging on said primary reflecting means is reflected to said secondary reflecting means, retrodirected by said secondary reflecting means to said primary reflecting means and further reflected by said primary reflecting means to the area of origin of the energy, and means responsive to a modulation source for driving said secondary reflecting means away from the focus point of said primary reflecting means.

2. The modulator and retrodirector of claim 1 wherein said primary and secondary reflecting means have spherical reflecting cross-sections and a common geometrical axis, said reflecting cross-sections having opposite directions of and unequal amounts of curvature, the center of curvature of said reflecting means being coincident.

3. The modulator and retrodirector of claim 2 wherein the reflecting surface of said primary and secondary reflecting means are concave and convex, respectively.

4. The modulator and retrodirector of claim 3 further including a lens having a circular cross-section and the same amount of and center of curvature as said secondary reflecting means for correcting aberrations introduced by said reflecting means, said lens being concentric with said secondary reflecting means.

5. The modulator and retrodirector of claim 4 wherein said lens and both said reflecting means are spherical and have centers of rotation about said geometrical axis.

6. The modulator and retrodirector of claim 5 further including additional means for correcting for spherical aberrations introduced by said reflecting means.

7. The modulator and retrodirector of claim 6 wherein said additional correcting means comprises an aspherical lens having a center of rotation coincident with said geometrical axis, said aspherical lens including an undulating surface having a center coincident with said center of curvature.

8. A modulator and retrodirector for optical energy comprising a reflector having a focal point, a focus spoiling mirror located approximately at said focal point, said reflector and mirror both being spherical and having differing radii and coincident centers of curvature and means responsive to a modulation source for driving said mirror away from said point.

References Cited

UNITED STATES PATENTS 3,110,812  11/1963  Hulett et al.
3,363,196  1/1968  Eknayan.

RONALD L. WIBERT, Primary Examiner

T. MAJOR, Assistant Examiner

U.S. Cl. X.R.

250—199; 350—200